US009685683B2

(12) United States Patent
Hiroe

(10) Patent No.: US 9,685,683 B2
(45) Date of Patent: Jun. 20, 2017

(54) POWER STORAGE APPARATUS

(71) Applicant: TOYOTA JIDOSHA KABUSHIKI KAISHA, Toyota-shi, Aichi-ken (JP)

(72) Inventor: Yoshihiko Hiroe, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/923,961

(22) Filed: Oct. 27, 2015

(65) Prior Publication Data

US 2016/0126604 A1  May 5, 2016

(30) Foreign Application Priority Data

Oct. 30, 2014 (JP) ................................. 2014-222009

(51) Int. Cl.
*H01M 10/6566* (2014.01)
*H01M 10/613* (2014.01)
*H01M 10/625* (2014.01)
*H01M 2/10* (2006.01)
*H01M 10/6563* (2014.01)
*H01M 10/647* (2014.01)
*H01M 10/6557* (2014.01)

(52) U.S. Cl.
CPC ..... *H01M 10/6566* (2015.04); *H01M 2/1077* (2013.01); *H01M 10/613* (2015.04); *H01M 10/625* (2015.04); *H01M 10/647* (2015.04); *H01M 10/6557* (2015.04); *H01M 10/6563* (2015.04); *H01M 2220/20* (2013.01)

(58) Field of Classification Search
CPC ........... H01M 10/6566; H01M 10/613; H01M 10/625; H01M 10/647; H01M 10/6557; H01M 10/6563
See application file for complete search history.

(56) References Cited

U.S. PATENT DOCUMENTS

| 2011/0104548 | A1 | 5/2011 | Saito et al. |
| 2011/0200862 | A1* | 8/2011 | Kurosawa ........... H01M 2/1016 429/120 |
| 2012/0214041 | A1 | 8/2012 | Harada et al. |
| 2015/0228947 | A1 | 8/2015 | Nagamine et al. |

FOREIGN PATENT DOCUMENTS

| JP | 2006-286547 A | 10/2006 |
| JP | 2008-269985 A | 11/2008 |
| JP | 2009-277471 A | 11/2009 |
| JP | 2011096536 A | 5/2011 |
| JP | 2014110190 A | 6/2014 |
| JP | 2014179178 A | 9/2014 |
| WO | 2011040130 A1 | 4/2011 |

* cited by examiner

*Primary Examiner* — Gregg Cantelmo
(74) *Attorney, Agent, or Firm* — Sughrue Mion, PLLC

(57) ABSTRACT

A power storage apparatus includes a plurality of spacers. The plurality of spacers is alternately stacked with the power storage devices. Each of the spacers defines a space through which cooling air flows. The spacers include first spacer and second spacer. The first spacer is a spacer disposed between the end plate and one of the plural power storage devices that is located adjacent to the end plate. The first spacer includes guide member. The guide member is arranged in a circumference of the opening of at least one of the inflow port and the outflow port so as to narrow the opening.

5 Claims, 5 Drawing Sheets

POWER STORAGE APPARATUS

INCORPORATION BY REFERENCE

The disclosure of Japanese Patent Application No. 2014-222009 filed on Oct. 30, 2014 including the specification, drawings and abstract is incorporated herein by reference in its entirety.

BACKGROUND OF THE INVENTION

1. Field of the Invention

The present invention relates to a structure of a power storage apparatus including a plurality of stacked power storage devices.

2. Description of Related Art

An assembled battery may be configured by stacking a plurality of battery cells, for example. In this case, there may be formed a cooling space for cooling air to cool the battery cells between every two adjacent battery cells disposed in the stacking direction.

The assembled battery including the plurality of stacked battery cells has a higher thermal radiation in both end sections of the assembled battery than in a central section thereof in the stacking direction. For example, the battery cells located in the both end sections are adjacent to corresponding end plates, and the end plates function as radiator plates; therefore, the battery cells located in the both end sections have a higher thermal radiation.

Meanwhile, as disclosed in Japanese Patent Application Publication No. 2008-269985, each of the stacked battery cells may be provided with a cooling space through which cooling air flows so as to cool the battery cell. Unfortunately, acceptance of a cooling air flow also causes the air in the cooling space to flow out to the outside from an inflow port or an outflow port of the cooling air provided to the cooling space, which makes it difficult for the air to stay in the cooling space.

In such a case, in spite of introducing no cooling air, the air moving in the cooling space because of natural convection flows out to the outside of the cooling space; therefore, in a lower-temperature environment, the battery cells located in the end sections having a higher thermal radiation are further cooled.

If variation in temperature in the stacking direction among the plural battery cells becomes greater, it becomes difficult to sufficiently exert a battery performance of the entire assembled battery. This is because an internal resistance becomes increased at a lower temperature in each battery cell, and thus a voltage behavior becomes greatly changed.

SUMMARY OF THE INVENTION

An object of the present invention, which has been made in order to solve the problems according to the conventional art, is to provide a power storage apparatus capable of accepting a cooling air flow in the power storage apparatus provided with spaces where cooling air is caused to flow, the spaces formed by alternately disposing spacers and power storage devices, and also capable of reducing variation in temperature among the plural power storage devices.

A power storage apparatus related to the present invention includes a plurality of power storage devices, end plates and a plurality of spacers. The plurality of power storage devices is stacked in a predetermined direction. The end plates are disposed at ends in the predetermined direction of the plurality of stacked power storage devices. The plurality of spacers is alternately stacked with the power storage devices. Each of the spacers defines a space through which cooling air flows. The spacer has an inflow port and an outflow port of the cooling air. The inflow port and the outflow port are openings communicated with the space. The spacers includes first spacer and second spacer. The first spacer is a spacer disposed between the end plate and one of the plural power storage devices that is located adjacent to the end plate. The second spacer is a spacer other than the first spacer. The first spacer includes guide member. The guide member is arranged in a circumference of the opening of at least one of the inflow port and the outflow port so as to narrow the opening.

According to the present invention, it is possible to cause the air moving in the space due to the natural convection to stay in the space with guide members.

In particular, the air moving toward the inflow port or the outflow port due to the natural convection is so guided by the guide members as not to flow out to the outside of the space, thereby generating air flows likely to stay in the space. Specifically, the air flows likely to stay in the space generated by the guide members function as air curtains to hinder the air flows moving toward the inflow port or the outflow port. Accordingly, it is possible to hinder the air flows moving in the space because of the natural convection from flowing out from the inflow port or the outflow port.

Hence, each spacer located in each end section of the power storage apparatus experiences deterioration of the cooling performance because of stagnation of the cooling air. However, each spacer located in each end section functions as an air insulating layer in a lower-temperature environment. Accordingly, it is possible to reduce thermal radiation of the power storage devices located in the end sections. In a lower-temperature environment, the temperature of the power storage devices located in the end sections of the power storage apparatus tends to become lower. Hence, according to the present invention, it is possible to reduce variation in temperature among the plural power storage devices.

Each of the first spacer and the second spacer may include an upper surface that closes an upper end between the power storage device and each of the first spacer and the second spacer. The second spacer may have the openings at both ends in a right and left direction. Each of the openings may open from a top end to a bottom end of the power storage device. The first spacer may include a plurality of guide members. The guide members may include upper guide members. The upper guide members may downwardly extend from upper ends at both ends in the right and left direction of the first spacer. With this configuration, even if the air having moved upward in the space due to the natural convection flows toward the openings, the guide members guide the air from above to below. Even if the air moving in the space due to the natural convection flows toward the openings, it is possible to cause this air to stay in the space with the guide members.

In particular, the guide members downwardly guide the air having upwardly moved in the space due to the natural convection. Hence, air flows moving downward along opening surfaces of the respective openings located below the corresponding guide members are generated in the space. The air flows downwardly flowing along the opening surfaces of the openings function as air curtains to hinder the air flows moving toward the openings, thereby hindering the air from flowing out from the openings.

The guide members may further include lower guide members. The lower guides member may upwardly extend from each of lower ends at both ends in the right and left direction of the first spacer. An inner surface of each of the lower guide members is located more outward in the right and left direction than an inner surface of each of the upper guide members.

By providing the lower guide members, it is possible to block the air flows guided from above to below by the guide members so as not to flow out from the openings to the outside. Accordingly, it is possible to generate circulating flows including the air flows downwardly flowing along the opening surfaces of the openings, and thus the air is likely to stay in the space. The inner surface of each lower guide member is located more outward than the inner surface of the guide member; therefore, the air flow downwardly moving guided by the guide member is led to easily flow along the inner surface of the lower guide member, so that the air is likely to stay in the space.

The spacer may include a plurality of ribs defining a plurality of flow passages of the cooling air in the space. The plurality of ribs is arranged from an upper position to a lower position in the spacer in a manner as to define the plurality of flow passages. Ends of the flow passages may be located more inward than the opening in the right and left direction, and open toward the opening. The upper guide member may cover at least the opening of the flow passage located at the top end among the plurality of flow passages.

The both ends of the flow passages opening toward the corresponding openings are located more inward than the corresponding openings in the right and left (lateral) direction; therefore, it is possible to hinder the air flows moving along the flow passages due to the natural convection from directly flowing out from the openings to the outside of the spacer. In addition, the guide members downwardly extend from the upper ends of the openings in a manner as to cover at least the openings of the flow passages located at the top end. The downward air flows generated by the guide members are caused in the upstream of the air flow moving due to the natural convection, thereby generating the air curtains to block the air flows moving toward the openings from the other flow passages located more downward than the flow passages located at the top end. Accordingly, the air moving in the space due to the natural convection becomes likely to stay in the space.

The cooling air may flow in from a bottom surface side of the spacer and flows out from the openings located at the both ends in the right and left direction of the spacer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the present invention will be described hereinafter.

Figure 1:
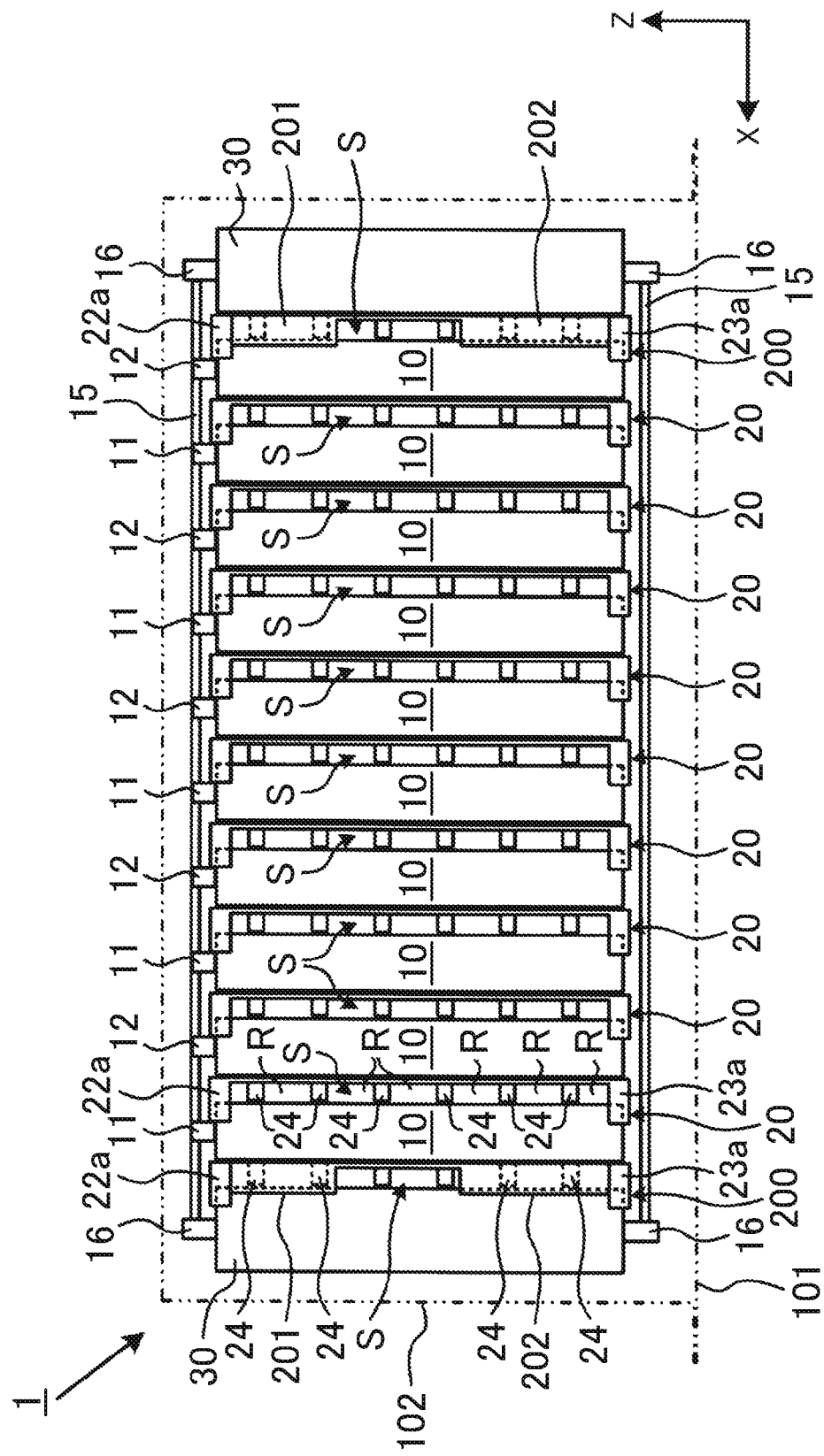
FIG. 1 is a side view of an assembled battery including a thermal regulating structure.

FIG. 1 to FIG. 5 are drawings showing Embodiment 1. FIG. 1 is a side view of an assembled battery 1 including a thermal regulating structure of the present embodiment. In FIG. 1 and other drawings, an X axis, a Y axis, and a Z axis orthogonally intersect one another. The relation of the X axis, the Y axis, and the Z axis is the same as that in the other drawings. In the present embodiment, an axis corresponding to a vertical direction is defined as the Z axis.

The assembled battery 1 of the present embodiment (an example of a power storage apparatus) is mounted to a vehicle as a power supply apparatus for supplying electric power to a drive motor. The vehicle herein may be a hybrid vehicle, an electric vehicle, or the like. A hybrid vehicle is equipped with another power source, such as a fuel cell and an internal combustion engine, as well as the assembled battery 1 as a power source to drive the vehicle. An electric vehicle is equipped with only the assembled battery 1 as a power source of the vehicle.

The assembled battery 1 includes a plurality of battery cells 10 (an example of power storage devices). The battery cells 10 are so-called square batteries. A square battery includes a rectangular parallelepiped battery case and a power generating element contained in this battery case. Each battery cell 10 has a square outer shape whose longitudinal direction extends in the Y direction. The battery case may be formed of metal, for example.

An inside of the battery case is put in a sealed state. The power generating element is an element that carries out charging and discharging. The power generating element includes a positive electrode plate, a negative electrode plate, and a separator disposed between the positive electrode plate and the negative electrode plate. The configuration of the power generating element is a well-known technique, and thus detailed description thereof will be omitted.

As the battery cell 10, a secondary battery, such as a nickel-metal hydride battery and a lithium-ion battery, may be used. Instead of a secondary battery, an electric double layer capacitor (condenser) may be used.

The assembled battery 1 may be configured by electrically connecting the plural battery cells 10 arranged in the X direction (an example of a predetermined direction of the present invention). Z-directional top ends of the battery cells 10 are provided with positive electrode terminals 11 and negative electrode terminals 12, respectively. Each positive electrode terminal 11 and each negative electrode terminal 12 are located apart from each other in the Y direction. In every two adjacent battery cells 10 in the X direction, the positive electrode terminal 11 of one battery cell 10 is electrically connected to the negative electrode terminal 12 of the other battery cell 10 through a not-shown bus bar. The plural battery cells 10 arranged in the X direction are electrically connected in series through the bus bar.

The assembled battery 1 is formed in a long shape extending in the X direction. The X direction is a direction where the plural battery cells 10 included in the assembled battery 1 are stacked, which is a longitudinal direction of the assembled battery 1. A spacer 20 is disposed between every two adjacent battery cells 10 in the X direction. In the assembled battery 1 of the present embodiment, every battery cell 10 and every spacer 20 (also including an end-section spacer 200 described later) are alternately disposed, and the plural battery cells 10 are arranged in a manner as to be stacked in the X direction with every spacer 20 held between every two adjacent battery cells 10.

The assembled battery 1 is equipped with a pair of end plates 30 at both X-directional ends (both ends of the plural battery cells 10) of the assembled battery 1. Restraint members 15 extending in the X direction are connected to the pair of end plates 30. The restraint members 15 are respectively disposed to a top surface and a bottom surface of the assembled battery 1 in the Z direction. Both ends of each restraint member 15 are fixed to the pair of end plates 30, thereby applying a restraining force to the battery cells 10 included in the assembled battery 1. The restraining force is a force to hold the battery cells 10 between both sides in the X direction. The top surface and the bottom surface of each end plate 30 are provided with respective coupling portions 16 to which the corresponding restraint members 15 are coupled. The respective coupling portions 16 are fixed to corresponding X-directional ends of the restraint members 15 with fastening bolts or the like, respectively.

Figure 2:
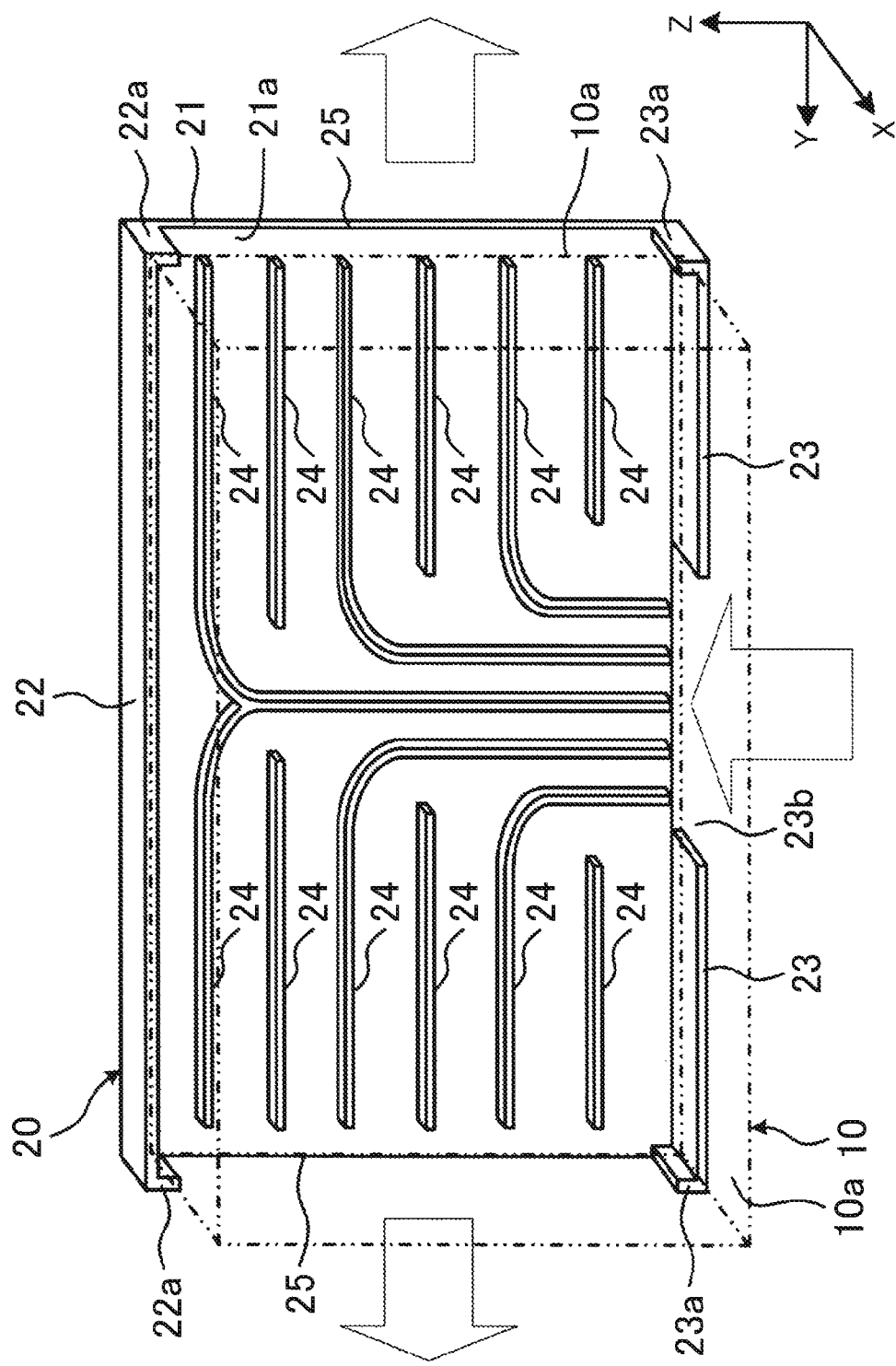
FIG. 2 is a schematic perspective view of a spacer.

FIG. 2 is a schematic view of the spacer 20 of the present embodiment. The spacer 20 may be formed of a thermal insulating material such as resin. The spacer 20 is a partition member forming a cooling space S through which cooling air that is a thermal regulating air flows. Each spacer 20 is disposed between two adjacent battery cells 10 as shown in FIG. 1.

Each spacer 20 is so disposed as to be held between two adjacent side surfaces 10*a* of two adjacent battery cells 10. The side surface 10*a* is a surface of the battery cell 10 of interest that orthogonally intersects an arrangement direction of the battery cells 10, and faces another adjacent battery cell 10 through the spacer 20. Each spacer 20 includes: a flat planar base portion 21 extending in a Y-Z plane substantially in parallel with the side surface 10*a* of each battery cell 10; an upper projecting portion 22 projecting in the X direction from an upper end of the base portion 21, and a lower projecting portion 23 projecting in the X direction from a lower end of the base portion 21.

The upper projecting portion 22 and the lower projecting portion 23 extend in the Y direction. The cooling space S is formed in an area located between the upper projecting portion 22 and the lower projecting portion 23 in the X direction. A cut-out portion 23*b* is formed in a substantially central portion of the lower projecting portion 23 in the Y direction.

A Y-directional length of the base portion 21 is substantially the same as a Y-directional length of each battery cell 10. A distance between the upper projecting portion 22 and the lower projecting portion 23 is substantially the same as a Z-directional height of each battery cell 10.

Both Y-directional ends of the upper projecting portion 22 are provided with side pieces 22*a* downwardly projecting in the Z direction, respectively. An inner surface of each side piece 22*a* comes into contact with a top end of the battery cell 10. Both Y-directional ends of the lower projecting portion 23 are provided with side pieces 23*a* upwardly projecting in the Z direction. An inner surface of each side piece 23*a* comes into contact with a bottom end of each battery cell 10.

A front surface 21*a* of the base portion 21 is provided with a plurality of ribs 24 projecting in the X-direction so as to form flow passages R of the cooling air. The ribs 24 are arranged at predetermined intervals. X-directional ends of the ribs 24 come into contact with the side surface 10*a* of the battery cells 10. The ribs 24 define the cooling space S between the side surface 10*a* and the base portion 21, and the ribs 24 also partition the cooling space S into a plurality of flow passages R.

The cooling space S is closed by the upper projecting portion 22 at a position on the top-end side of the battery cell 10, and is also closed by the lower projecting portion 23 at a position on the bottom-end (bottom-surface) side of the battery cell 10 except for the cut-out portion 23*b*. The spacer 20 opens at both sides thereof located at the both Y-directional ends of the battery cell 10. A section between a Z-directional end of each side piece 22*a* and a Z-directional end of each side piece 23*a* is formed as an opening 25 of the cooling space S for allowing outflow of the cooling air. Each opening 25 opens from the top end to the bottom end of the battery cell 10 (spacer 20).

The spacer 20 of the present embodiment provides the cooling space S introducing the cooling air from a bottom surface of the battery cell 10 through the cut-out portion 23*b*, and also causing the cooling air to flow out from the respective openings 25 located at both right and left (lateral) directional ends of the battery cell 10. The cut-out portion 23*b* serves as an opening allowing inflow of the cooling air. As shown in FIG. 2, the ribs 24 may be provided in a manner as to extend along the cooling air flows flowing from the cut-out portion 23*b* toward the openings 25. For example, the ribs 24 may be so formed as to vertically extend from the cut-out portion 23*b*, and then extend substantially in parallel in the Y direction toward the openings 25.

In each of the plural flow passages R partitioned by the ribs 24, an end of the flow passage R formed between the adjacent ribs 24 extending substantially in parallel in the Y direction is located more inward than the corresponding opening 25, and opens toward this opening 25 in the Y direction.

In an example of FIG. 1, the assembled battery 1 is placed on a lower case 101, and the top surface of the assembled battery 1 is covered with an upper case 102. An intake passage through which the cooling air supplied from a not-shown blower flows is provided between a bottom surface of the assembled battery 1 and the lower case 101. The cooling air flowing through the intake passage flows through the cut-out portion 23*b* into the cooling spaces S between the battery cells 10. Between Y-directional side surfaces of the assembled battery 1 and the upper case 102, there is formed an exhaust passage through which the cooling air heat-exchanged with the battery cells 10 and exhausted from the openings 25 flows. The cooling air heat-exchanged with the battery cells 10 is exhaust through the exhaust passage to the outside.

As shown in FIG. 1, between every two adjacent battery cells 10 in the X direction, each spacer 20 of the present embodiment is disposed in such a manner that the cooling space S is formed between the spacer 20 and the side surface 10*a* of one battery cell 10, and the side surface 10*a* of the other battery cell 10 is in contact with a back surface of the base portion 21. The cooling air flowing through the cooling space S comes into contact with the side surface 10*a* of the one battery cell 10, and also comes into contact with the front surface 21*a* of the base portion 21 in contact with the side surface 10*a* of the other battery cell 10. The cooling air is subjected to direct heat-exchange with, or indirect heat-exchange through the base portion 21 with the battery cells 10 located at the both X-directional ends of the cooling space S.

In the spacer 20 of the present embodiment, each of the openings 25 located at the both Y-directional ends of the battery cells 10 widely opens from the top end to the bottom end of the battery cell 10. The ends of the flow passages R formed between the adjacent ribs 24 extending substantially in parallel in the Y direction open toward the corresponding openings 25 in the Y direction, and thus the spacer 20 is not closed in the Y direction. Hence, each opening 25 has a large sectional area of the flow passage in the X-Z plane. Accordingly, it is possible to reduce pressure loss of the cooling air introduced into the cooling space S, thus introducing more cooling air to cool the battery cells 10.

On the other hand, the spacer 20 may also be disposed between each end plate 30 and the battery cell 10 adjacent to this end plate 30. In a higher-temperature environment, for example, by using the spacer 20 as shown in FIG. 2, it is possible to introduce more cooling air so as to actively cool the battery cell 10 in the same manner as in the central section. However, in a lower-temperature environment in which no cooling air is introduced, a temperature at the battery cells 10 adjacent to the end plates 30 is likely to become lower; therefore, variation in temperature in the stacking direction becomes greater among the plural battery cells 10.

This means that the assembled battery 1 has a higher thermal radiation of the battery cells 10 in the end sections than in the central section of the assembled battery 1 in the stacking direction. In particular, the battery cells 10 in the both end sections are adjacent to the respective end plates 30, and the end plates 30 function as radiator plates, and thus the thermal radiation of the battery cells 10 in end sections of the assembled battery 1 become higher.

Although the air in the cooling space S moves upward because of the natural convection, the openings 25 of each spacer 20 widely open up to the top end of the battery cell 10; thus the air moving due to the natural convection flows out from the openings 25 to the outside of the spacer 20 without staying in the cooling space S. Hence, even in a state in which no cooling air is introduced, the air flows into or out of the cooling space S through the openings 25 due to the natural convection, and thus the battery cells 10 of which thermal radiation is higher located in the end sections become further cooled.

In the present embodiment, among the spacers 20 alternately arranged with the battery cells 10 in the stacking direction, each of the spacers 20 disposed between the respective end plates 30 and the corresponding battery cells 10 adjacent to the end plates 30 is provided with guide members 201, 202 that hinder the air moving in the cooling spaces S due to the natural convection from flowing out from the openings 25 to the outside.

Each spacer 20 provided with the guide members 201, 202 serves as an end-section spacer 200 (an example of a first spacer of the present invention). The end-section spacer 200 has the same configuration as that of the spacer 20 as shown in FIG. 2 except for the guide members 201, 202.

Figure 3:
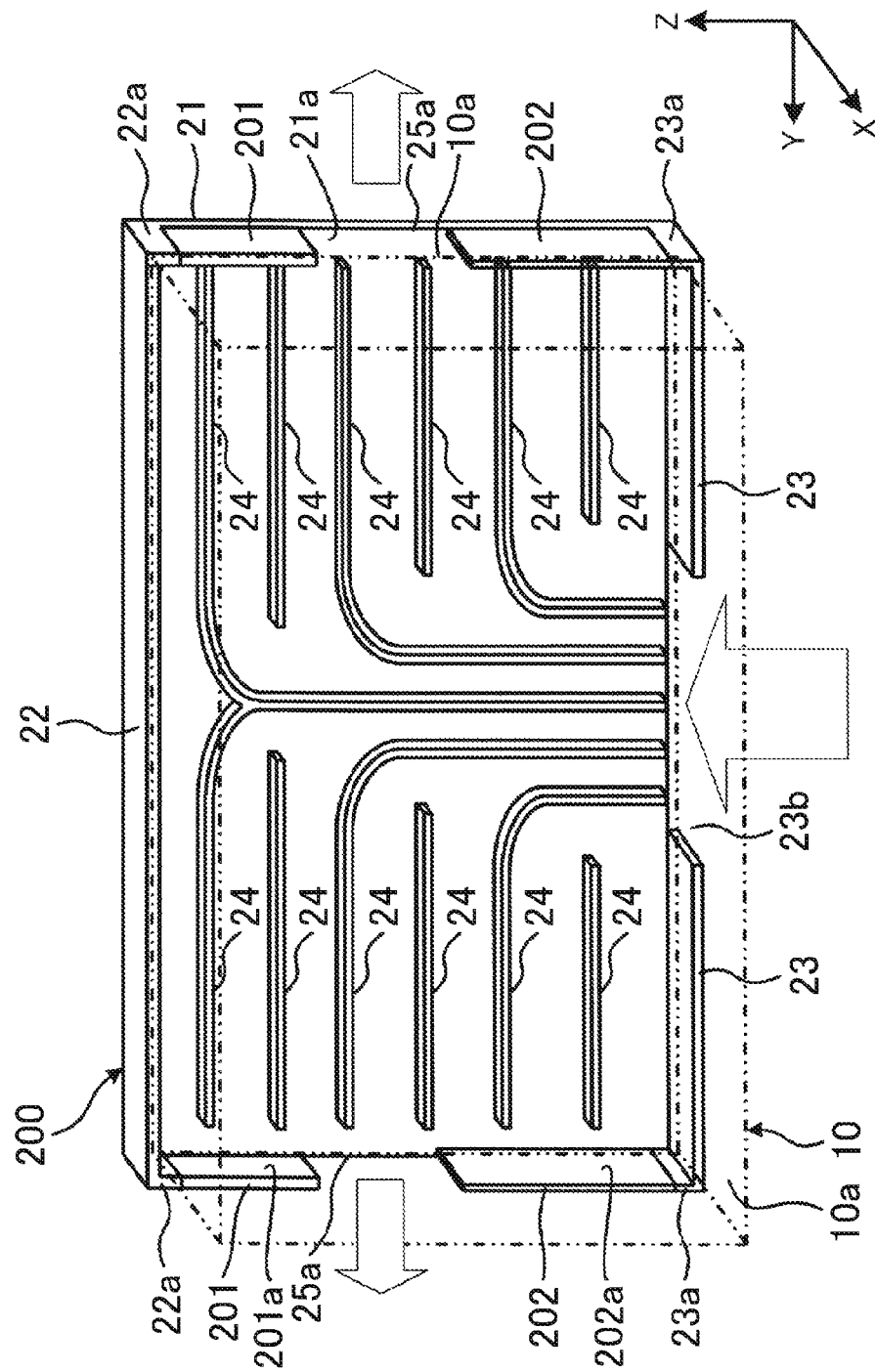
FIG. 3 is a schematic perspective view of an end-section spacer disposed between an end plate and a battery cell in each end section in a stacking direction.

FIG. 3 is a schematic perspective view of the end-section spacer 200 of the present embodiment. The same reference numerals are used for components that are common to those in FIG. 2, and description thereof will be omitted. As shown in FIG. 3, each guide member 201 is a guide member downwardly extending from an end of the side piece 22a located at the Z-directional upper end of each opening 25. Each guide member 201 may be integrally formed with the side piece 22a, or may be configured as a different member from the side piece 22a.

Each guide member 201 is configured as a projection to close a part of the corresponding opening 25 opening from the top end to the bottom end of the battery cell 10 so as to hinder the air flow in the Y direction, that is, the air flow from the opening 25 toward the outside of the cooling space S.

Each guide member 202 is a guide member upwardly extending from an end of the side piece 23a located at the Z-directional lower end of each opening 25. The guide member 202 may be integrally formed with the side pieces 23a, or may be configured as a different member from the side piece 23a. Each guide member 202 is configured as a projection to close a part of the corresponding opening 25 so as to hinder the air flow in the Y direction.

Between each guide member 201 and each guide member 202, an opening 25a is formed. A sectional area of the flow passage of each opening 25a becomes smaller in the Z direction than that of the opening 25 by a portion closed by the guide members 201, 202.

Figure 4:
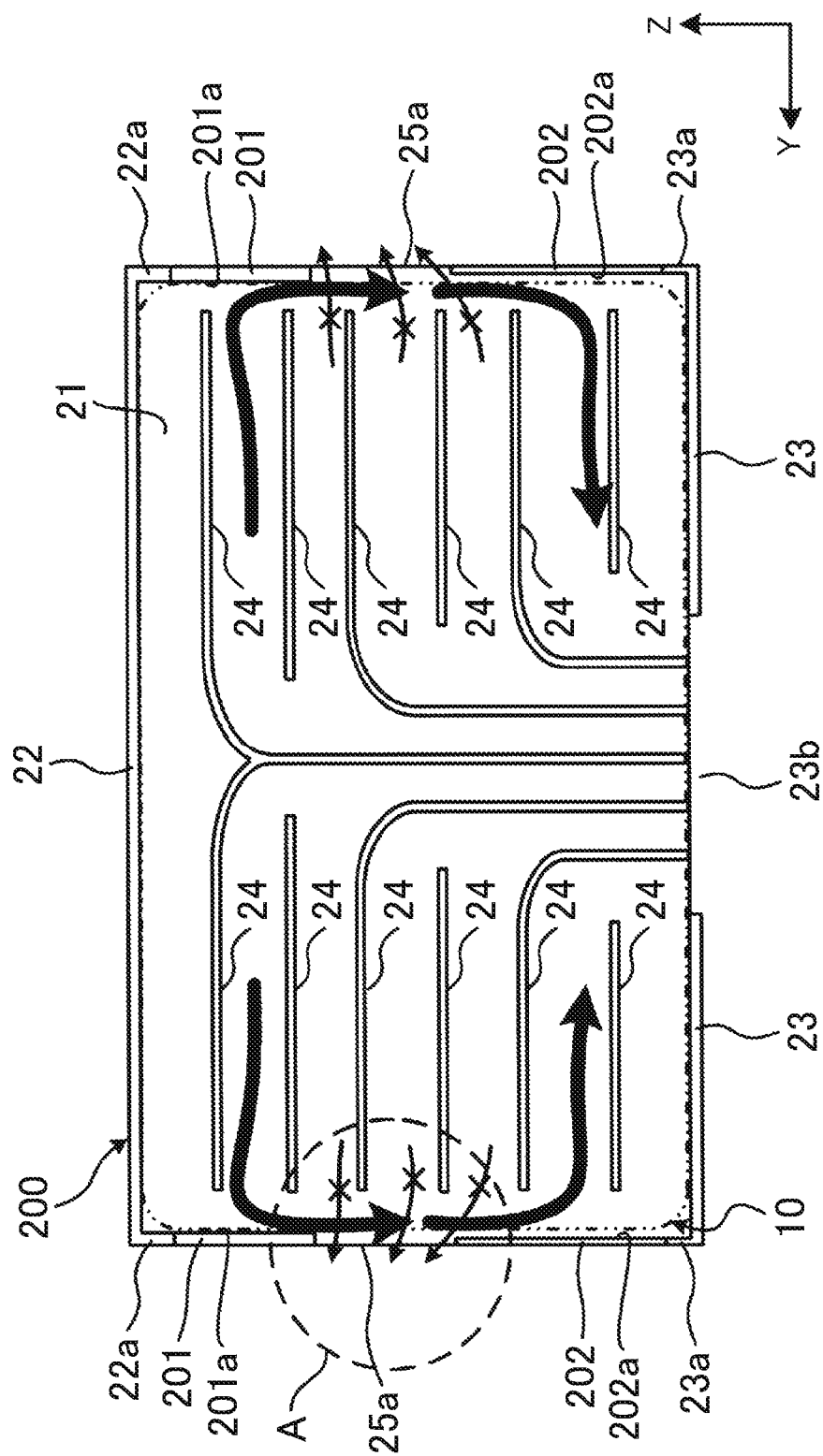
FIG. 4 is a front view of the end-section spacer.

FIG. 4 is a front view of the end-section spacer 200 of the present embodiment. In an example of FIG. 4, the battery cell 10 is indicated by a two-dot chain line. As shown in FIG. 4, each guide member 201 downwardly extends from the upper end of the corresponding opening 25 so as to hinder the air moving in the cooling space S due to the natural convection from flowing out from the opening 25 to the outside of the end-section spacer 200. Hence, even if the air having moved upward in the cooling space S due to the natural convection flows toward the openings 25, the guide members 201 guide the air from above to below. Accordingly, it is possible to cause the air moving in the cooling space S due to the natural convection to stay in the cooling space S.

The guide members 201 downwardly guide the air having upwardly moved in the cooling space S due to the natural convection. Hence, air flows moving downward along opening surfaces of the respective openings 25a located below the corresponding guide members 201 are generated in the cooling space S. The air flows downwardly moving along the opening surfaces of the openings 25a (arrows indicated by solid bold lines) function as air curtains to hinder the air flows moving toward the openings 25a. The air flows moving toward the openings 25a (arrows indicated by thin lines) are blocked by the air curtains, thereby hindering the air moving due to the natural convection from flowing out from the openings 25a.

Each end-section spacer 200 of the present embodiment accepts flowing of the cooling air for cooling the battery cells 10, and also functions as an air insulating layer relative to the corresponding end plate 30. This is because, in a lower-temperature environment, the guide members 201 bring the air in the cooling space S not to flow out to the outside, but to stay due to the natural convection. Accordingly, it is possible to reduce thermal radiation of the battery cells 10 located in the end sections, thereby reducing variation in temperature among the battery cells 10 in the stacking direction.

Each end-section spacer 200 of the present embodiment includes the guide members 202 as lower guide members. As aforementioned, the guide members 201 generate the air flows downwardly moving along the opening surfaces of the openings 25, thereby blocking the air flows moving toward the openings 25. In addition, by providing the guide members 202, it is possible to block the air flows guided from above to below by the guide members 201 so as not to flow out from the openings 25 to the outside. Accordingly, it is possible to generate circulating flows including the air flows downwardly flowing along the opening surfaces of the openings 25a, and thus the air is likely to stay in the cooling space S.

Figure 5:
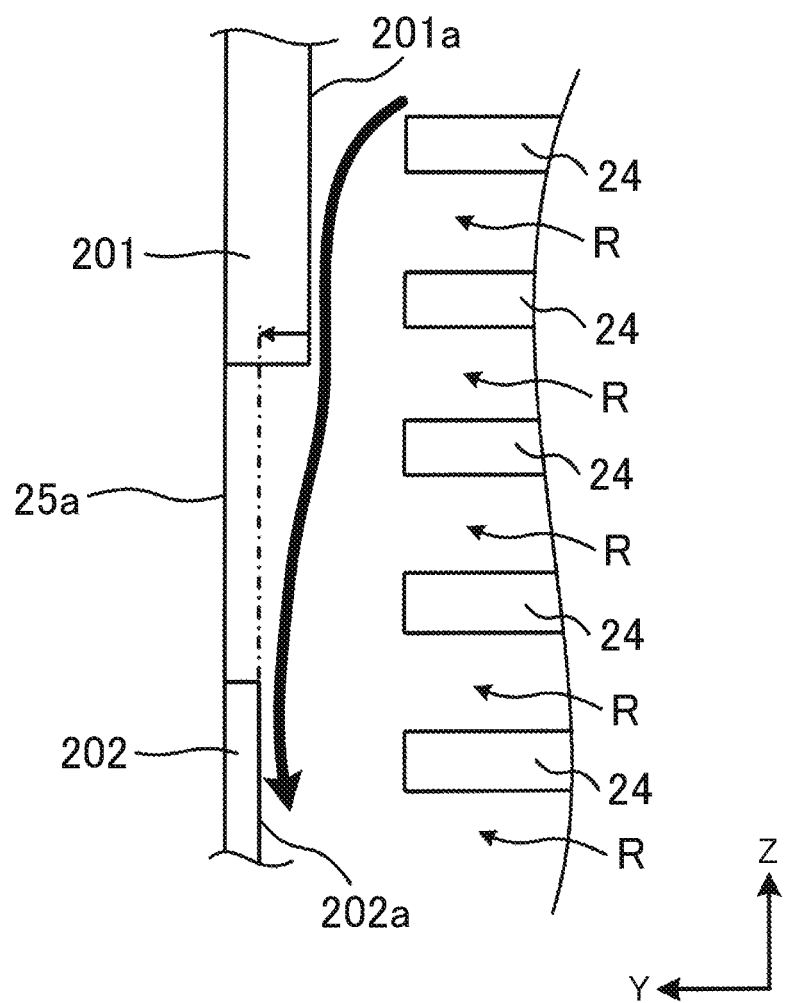
FIG. 5 is an enlarged view of an area A of FIG. 4.

Each guide member 202 of the present embodiment has an inner surface 202a located more outward in the Y direction than an inner surface 201a of the guide member 201. FIG. 5 is an enlarged view of an area A of FIG. 4. As shown in FIG. 5, the inner surface 202a of the guide member 202 is located more outward than the inner surface 201a of the guide member 201; thus, even if the air flow downwardly moving (solid bold line) guided by the guide member 201 moves outward in the Y direction, the air flow is easily led to flow along the inner surface 202a of the guide member 202. Accordingly, the air is likely to stay in the cooling space S.

Each guide member 202 is formed to have a thinner Y-directional thickness than that of each guide member 201, thereby disposing the inner surface 202a more outward in the Y direction than the inner surface 201a. It may also be configured so that each entire guide member 202 including the side piece 23a is shifted more outward in the Y direction than each guide member 201 so as to dispose the inner surface 202a more outward than the inner surface 201a. At this time, as shown in FIG. 4, the side piece 23a may be formed to have a thinner Y-directional thickness in accordance with the thickness of the guide member 202, but the side piece 23a may be formed to have the same Y-directional thickness as that of the side piece 22a.

The both ends of the flow passages R opening toward the corresponding openings 25 are located more inward in the Y direction than the corresponding openings 25; therefore, it is possible to hinder the air moving along the flow passages R due to the natural convection from directly flowing out from the openings 25 to the outside of the end-section spacer 200.

In addition, each guide member 201 is configured to downwardly extend from the upper end of the end-section spacer 200 in a manner as to cover at least the openings of the flow passages R located at the top end of the battery cell 10 in the Y direction among the plural flow passages R extending substantially in parallel with one another in the Y direction, and arranged from the top end to the bottom end of each battery cell 10.

The air moving in the cooling space S due to the natural convection moves upward. Hence, by providing the guide members 201 that cover at least the openings of the flow passages R located at the top end, it is possible to generate air flows downwardly moving along the opening surfaces of the openings 25a. The downward air flows generated by the guide members 201 are caused in the upstream of the air flow moving due to the natural convection, thereby generating the air curtains to block the air flows moving toward the openings 25 from the other flow passages R located more downward in the Z direction than the flow passages R located at the top end. Accordingly, the air moving in the cooling space S due to the natural convection becomes more likely to stay in the cooling space S.

As aforementioned, the present embodiment of the present invention has been described, and the flow passages of each spacer 20 and each end-section spacer 200 may be formed such that the Y-directional ends on one side are formed as an inflow port of the cooling air and the Y-directional ends on the other side are formed as an outflow port thereof, as described in JP 2008-269985A. In this case, each end-section spacer 200 is provided with the guide members 201, 202 at the inflow port and the outflow port of the cooling air, respectively.

The direction of the air flow in the flow passages of the cooling air described in the aforementioned embodiment may be reversed (a flow of the cooling air is introduced from the both Y-directional ends, and flowed out from the lower end located at the bottom surface of the battery cell 10). In this case, the openings at the both Y-directional ends of the end-section spacer 200 serve as the inflow ports of the cooling air, and each of these inflow ports may be provided with the guide members 201, 202.

In addition, in the present embodiment, the end-section spacer 200 is disposed only between each end plate 30 and the battery cell 10 located in each X-directional end section, but the present invention is not limited to this. For example, the end-section spacer 200 may be disposed between each end plate 30 and the battery cell 10 located in each X-directional end section, and the end-section spacers 200 are further disposed respectively between several adjacent battery cells 10 inwardly located from the battery cell 10 located in each X-directional end. As described above, in the assembled battery 1, the thermal radiation becomes gradually higher from the central section toward the both end sections in the stacking direction, and plural end-section spacers 200 are disposed respectively between several adjacent battery cells 10 located close to the both end sections having a higher thermal radiation, thereby reducing variation in temperature among the battery cells 10 in the stacking direction.

The above embodiment has been described by way of example in which the cooling space S is covered with the upper projecting portion 22 at a position on the top-end side of the battery cell 10, but the present invention is not limited to this. Specifically, it may be configured that the upper projecting portion 22 may also be provided with a cut-out portion, as similar to the cut-out portion 23b of the lower projecting portion 23 so as to form an inflow port or an outflow port without closing the upper end of the cooling space S. In this case, even if the air having upwardly moved in the cooling space S due to the natural convection flows toward the openings 25, the guide members 201, 202 also cause the air to become more likely to stay in the cooling space S.

The spacer 20 (end-section spacer 200) may be configured such that the cooling space S is closed in the right and left (lateral) direction without providing the openings 25, but the openings 25 are provided in the vertical direction. In this case, the end-section spacer 200 may be provided with the guide members 201 inwardly extending toward the upper-end opening 25 so as not to close the opening 25. Through this configuration, it is possible to cause the air moving in the cooling space S due to the natural convection to stay in the space S with the guide members 201 even if the air flows toward the upper-end opening 25 for the inflow or the outflow.

The air flowing toward the upper-end opening 25 due to the natural convection is so guided by the guide members 201 as not to flow out to the outside of the cooling space S, thereby generating air flows likely to stay in the cooling space S. Specifically, the air flows likely to stay in the cooling space S generated by the guide members 201 function as air curtains to hinder the air flows moving toward the upper-end opening 25, thus hindering the air flows moving in the cooling space S due to the natural convection from flowing out from the upper-end opening 25.

The thermal regulating structure of the present invention is provided with the spacers 20 each of which includes the inflow port and the outflow port of the cooling air for the cooling space S regardless of the positions of the openings of the inflow port and the outflow port of the cooling space S; and among the spacers 20, each of the end-section spacers 200 is configured to include the inflow port and the outflow port at least one of which is provided with the guide members inwardly extending toward the corresponding opening so as not to close the opening. It is possible to cause the air moving in the cooling space S due to the natural convection to stay in the cooling space S with the guide members 201 and the guide members 202 even if the moving air flows toward the inflow port or the outflow port (opening 25). Accordingly, as aforementioned, it is possible to reduce variation in temperature among the plural power storage devices in a predetermined direction.

What is claimed is:

1. A power storage apparatus comprising:
a plurality of power storage devices stacked in a predetermined direction;
end plates disposed at ends in the predetermined direction of the plurality of stacked power storage devices; and
a plurality of spacers alternately stacked with the power storage devices, each of the spacers defines a space through which cooling air flows, each of the spacers has an inflow port and an outflow port of the cooling air, the inflow port and the outflow port being openings communicated with the space, the spacers including a first spacer and a second spacer, the first spacer being a spacer disposed between the end plate and one of the plurality of power storage devices that is located adjacent to the end plate, the second spacer being a spacer other than the first spacer,
wherein the first spacer includes a guide member, and
the guide member is arranged in a circumference of the opening of at least one of the inflow port and the outflow port of the first spacer, the opening having the guide member of the first spacer is narrower than the opening of the second spacer.

2. The power storage apparatus according to claim 1, wherein
each of the first spacer and the second spacer includes an upper surface that closes an upper end between the power storage device and each of the first spacer and the second spacer,
the second spacer has the openings at both ends in a right and left direction,
the first spacer includes a plurality of guide members, the plurality of guide members include upper guide members, and
the upper guide members downwardly extend from upper ends at both ends in the right and left direction of the first spacer.

3. The power storage apparatus according to claim 2, wherein
the plurality of guide members further includes lower guide members,
the lower guide members upwardly extend from lower ends at both ends in the right and left direction of the first spacer, and
an inner surface of each lower guide member is located more outward in the right and left direction than an inner surface of each upper guide member.

4. The power storage apparatus according to claim 2, wherein
the spacers include a plurality of ribs defining a plurality of flow passages of the cooling air in the space, and the plurality of ribs is arranged from an upper position to a lower position in the spacers in a manner as to define the plurality of flow passages,
ends of the flow passages are located more inward than the openings in the right and left direction, and open toward the openings, and
the upper guide members cover at least the opening of the flow passage located at the top end among the plurality of flow passages.

5. The power storage apparatus according to claim 2, wherein
the cooling air flows in from a bottom surface side of the spacers and flows out from the openings located at the both ends in the right and left direction of the spacers.

* * * * *